US008056656B2

(12) United States Patent
Todd et al.

(10) Patent No.: US 8,056,656 B2
(45) Date of Patent: Nov. 15, 2011

(54) ANTI-TORQUE SYSTEM FOR A TRACTION ASSEMBLY

(75) Inventors: André Todd, Mont St-Hilaire (CA); Robert Handfield, St-Lucien (CA); Robert Bessette, Mont-St-Grégoire (CA); Chad Olson, Crosby, MN (US)

(73) Assignee: Soucy International Inc., Drummondville (CA)

( * ) Notice: Subject to any disclaimer, the term of this patent is extended or adjusted under 35 U.S.C. 154(b) by 0 days.

(21) Appl. No.: 12/964,138

(22) Filed: Dec. 9, 2010

(65) Prior Publication Data

US 2011/0079980 A1  Apr. 7, 2011

Related U.S. Application Data

(62) Division of application No. 11/626,116, filed on Jan. 23, 2007, now Pat. No. 7,870,914.

(30) Foreign Application Priority Data

Jan. 24, 2006 (CA) ...................................... 2533857

(51) Int. Cl.
*B62D 55/00* (2006.01)
*F16F 3/02* (2006.01)
*F16F 1/14* (2006.01)

(52) U.S. Cl. ..................... 180/9.25; 180/9.26; 180/9.28; 180/9.3; 180/9.1; 267/164; 267/152; 267/153; 267/154; 267/155; 267/157; 305/135; 305/128; 305/131

(58) Field of Classification Search .................. 180/9.25, 180/9.26, 9.28, 9.3, 9.1; 267/164, 152, 153, 267/154, 155, 157; 305/135, 128, 131
See application file for complete search history.

(56) References Cited

U.S. PATENT DOCUMENTS

| | | | | |
|---|---|---|---|---|
| 3,447,621 A | * | 6/1969 | Schoonover | 180/9.52 |
| 3,650,342 A | | 3/1972 | Pushnig | |
| 3,841,424 A | * | 10/1974 | Purcell et al. | 180/9.5 |
| 4,093,033 A | * | 6/1978 | Rosch | 180/9.56 |
| 4,126,302 A | * | 11/1978 | Curnutt | 267/221 |
| 4,230,199 A | * | 10/1980 | Stedman | 180/9.1 |
| 4,448,273 A | | 5/1984 | Barbieri | |
| 4,699,229 A | | 10/1987 | Hirose | |
| 4,721,325 A | * | 1/1988 | Mackovjak et al. | 280/124.155 |
| 4,738,436 A | * | 4/1988 | Loggers | 267/150 |
| 4,953,919 A | * | 9/1990 | Langford | 305/144 |
| 5,074,579 A | * | 12/1991 | Evangelisti | 280/124.155 |
| 5,467,971 A | * | 11/1995 | Hurtubise et al. | 267/220 |
| 5,607,210 A | | 3/1997 | Brazier | |
| RE36,284 E | * | 8/1999 | Kelderman | 305/129 |
| 5,954,148 A | | 9/1999 | Okumura | |
| 6,006,847 A | | 12/1999 | Knight | |

(Continued)

*Primary Examiner* — Paul N Dickson
*Assistant Examiner* — Marlon Arce
(74) *Attorney, Agent, or Firm* — François Carter; Robert Brouillette; Brouillette & Partners

(57) ABSTRACT

This invention relates to a traction assembly for a vehicle which uses an endless traction band and a plurality of wheels for propulsion. More particularly, the traction assembly comprises a sprocket wheel which has a different size and number of sprocket teeth depending on whether the traction kit replaces the front wheels or the rear wheels of the vehicle. The sprocket wheel of the traction kit can also be configured such that its sprocket teeth are laterally offset. The traction kit can also comprise an anti-torque system that prevent physical contact between the traction kit and the vehicle and that can bias the position of the traction kit in order to improve the steering performance. Finally, the traction assembly can comprise a pivotable extension which lengthens the traction assembly and improves its traction capabilities.

16 Claims, 14 Drawing Sheets

U.S. PATENT DOCUMENTS

| | | | |
|---|---|---|---|
| 6,095,275 A | 8/2000 | Shaw | |
| 6,318,484 B2 * | 11/2001 | Lykken et al. | 180/9.48 |
| 6,474,662 B1 * | 11/2002 | Cormican | 280/21.1 |
| 6,691,991 B1 * | 2/2004 | Huang | 267/291 |
| 6,715,575 B2 * | 4/2004 | Karpik | 180/193 |
| 6,832,659 B1 * | 12/2004 | Bares et al. | 180/9.22 |
| 6,874,586 B2 | 4/2005 | Boivin et al. | |
| 6,945,342 B1 * | 9/2005 | Hill | 180/9.54 |
| 6,981,563 B2 * | 1/2006 | Phely et al. | 180/9.21 |
| 7,395,890 B2 * | 7/2008 | Visscher | 180/193 |
| 7,497,530 B2 | 3/2009 | Bessette | |
| 7,552,979 B2 | 6/2009 | Christianson | |
| 2005/0206118 A1 * | 9/2005 | Czysz | 280/276 |
| 2010/0051358 A1 * | 3/2010 | Inaoka | 180/9.1 |

* cited by examiner

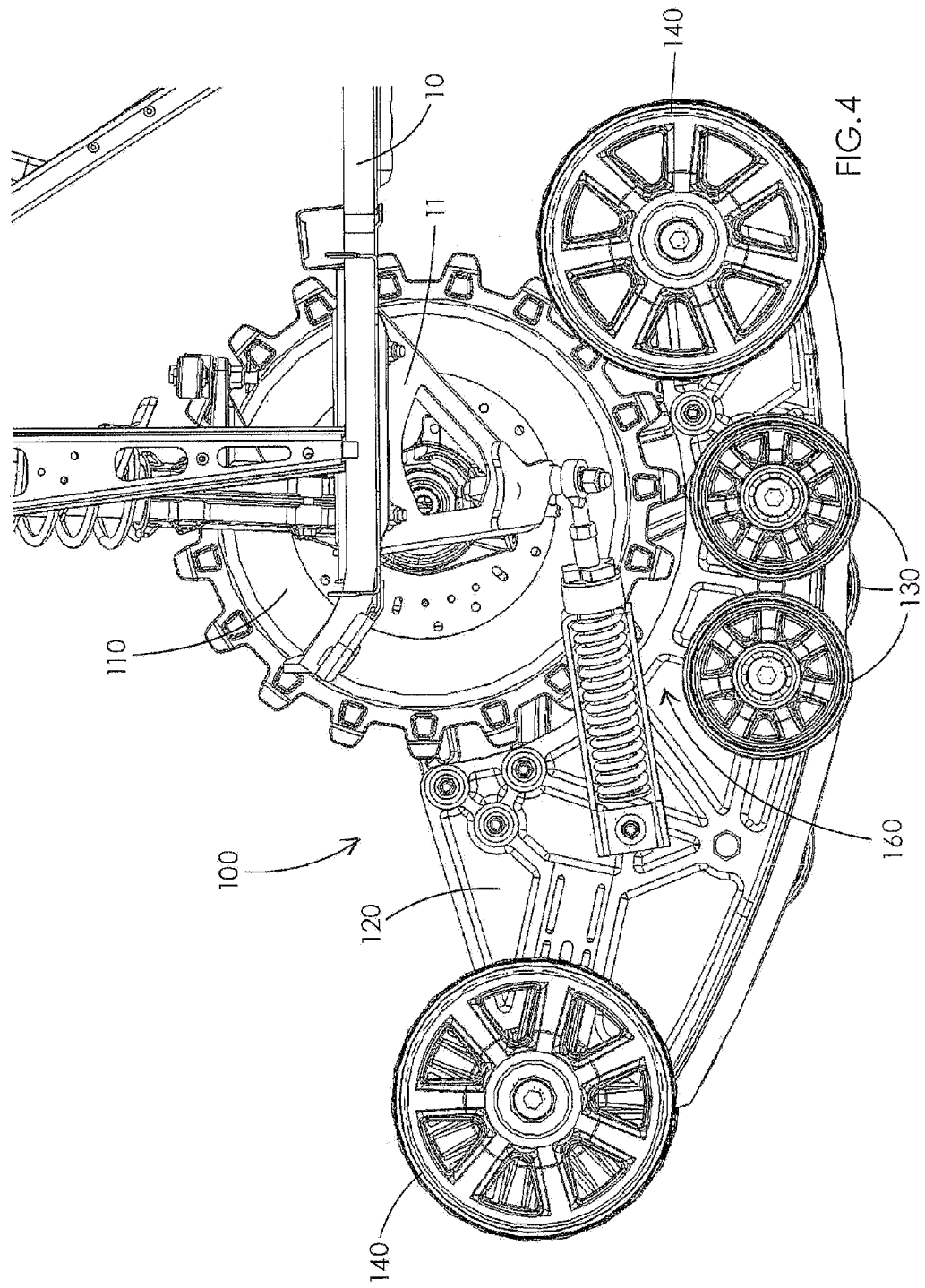

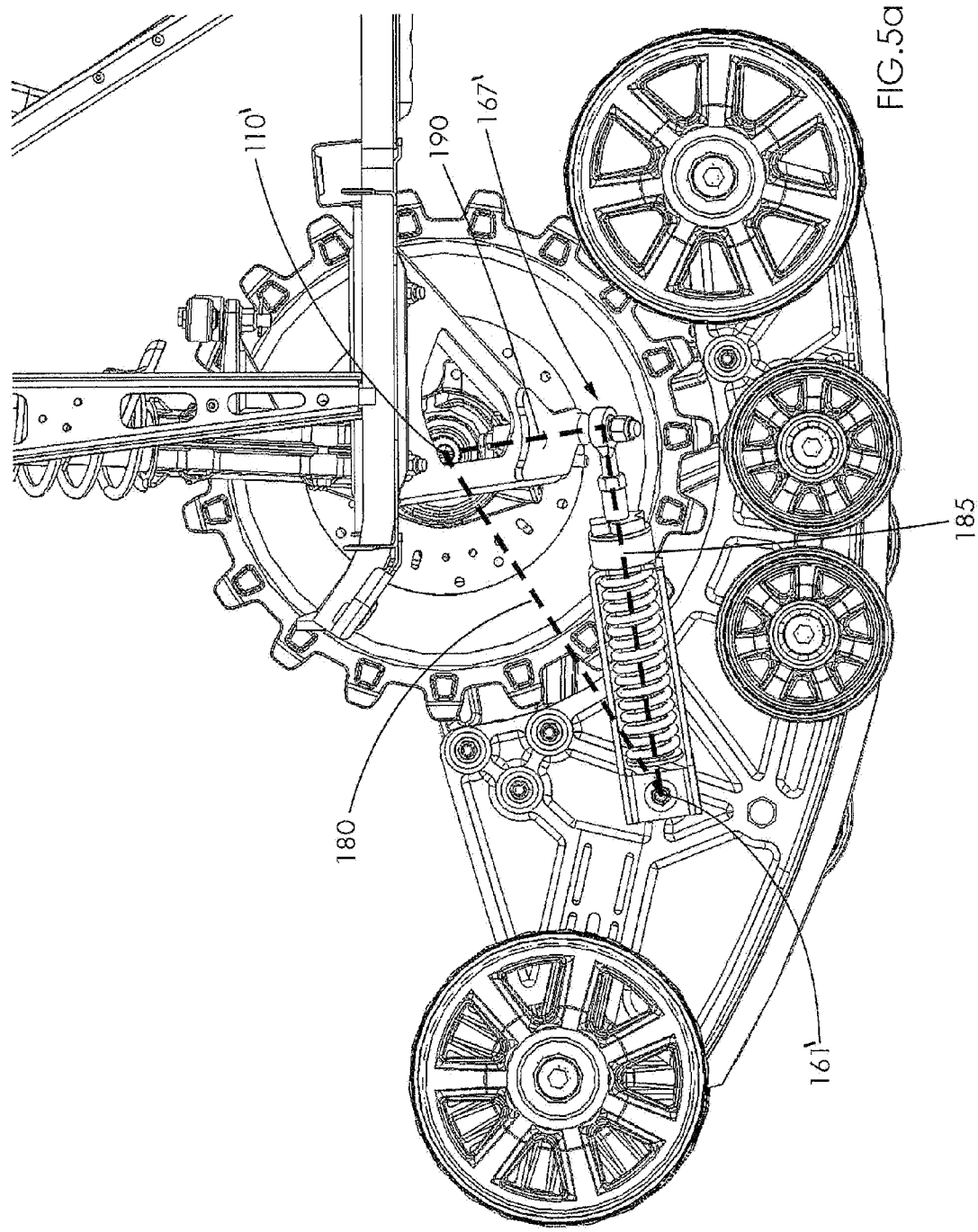

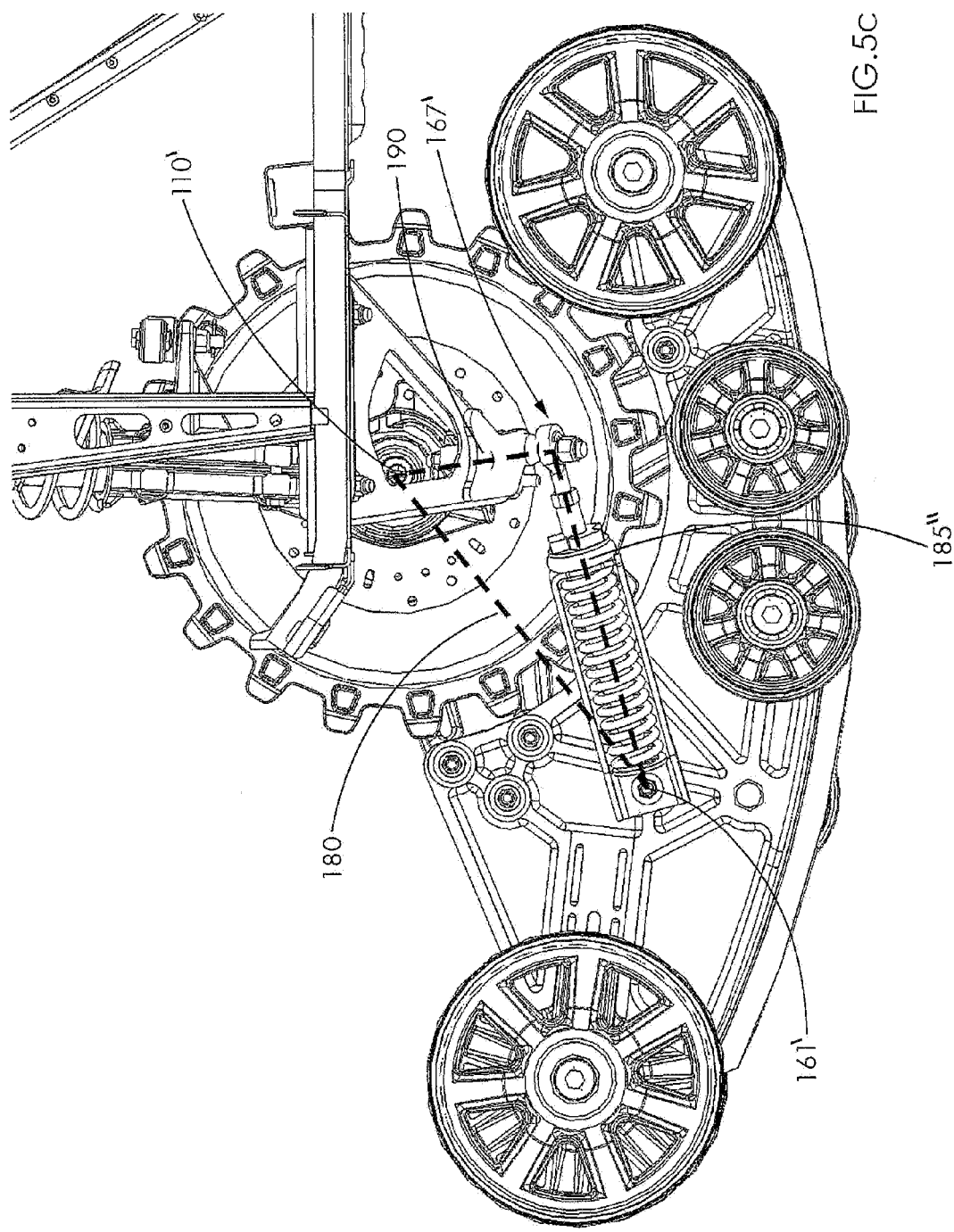

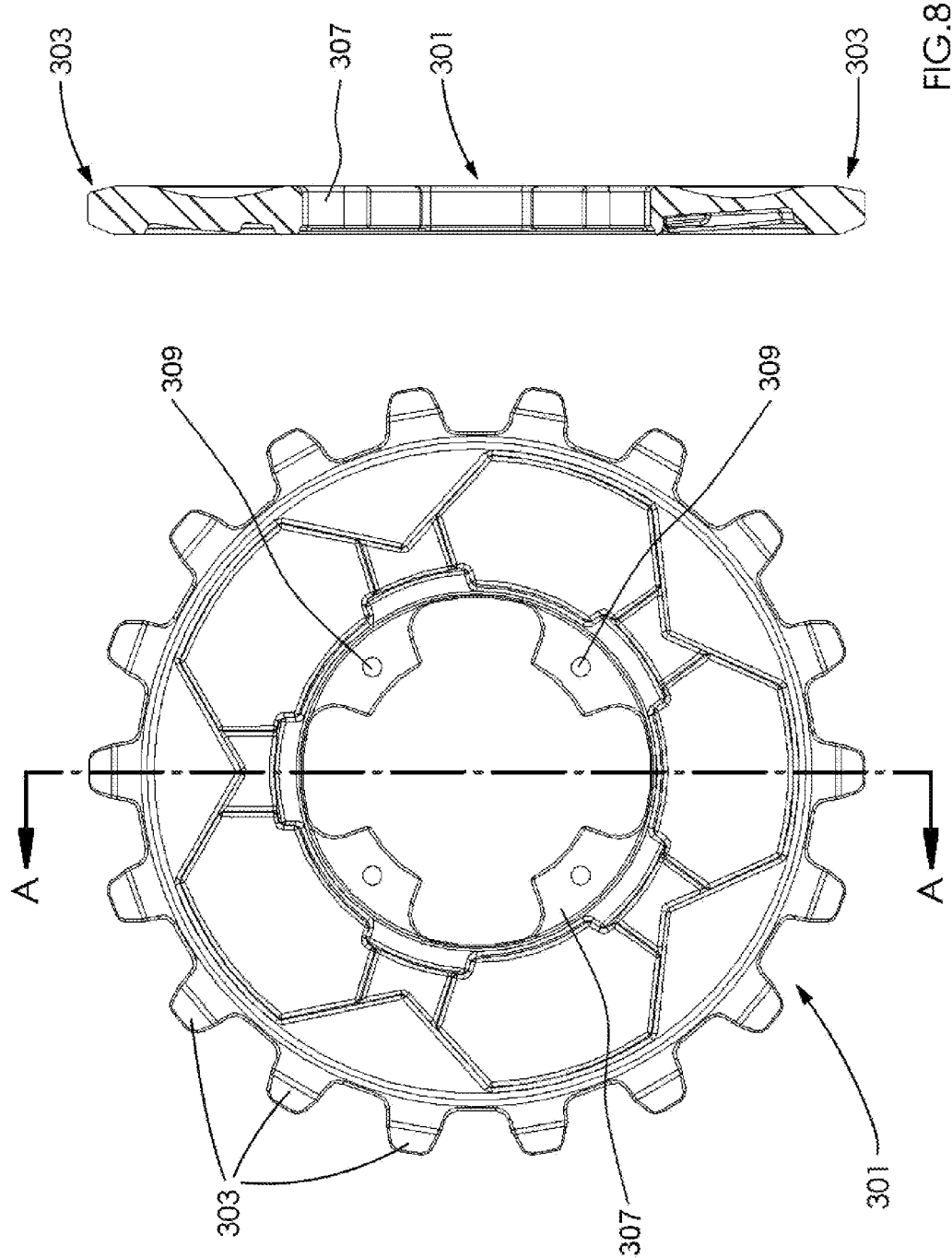

ANTI-TORQUE SYSTEM FOR A TRACTION ASSEMBLY

CROSS-REFERENCE TO RELATED APPLICATIONS

The present patent application is a divisional application of commonly assigned U.S. patent application Ser. No. 11/626,116, filed Jan. 23, 2007, now U.S. Pat. No. 7,870,914, itself claiming the priority of commonly assigned Canadian Patent Application No. 2,533,857, entitled "Improved Traction Assembly for a Vehicle" and filed on Jan. 24, 2006, at the Canadian Intellectual Property Office. The present application claims the benefits of priority of all these prior applications. The disclosures of these prior applications are incorporated herein by reference.

FIELD OF THE INVENTION

This invention relates to a traction assembly for a vehicle. More particularly, this invention relates to traction assemblies having different sprocket sizes, to traction assemblies having sprocket wheels with offset teeth, to anti-torque devices for traction assemblies and to traction assemblies' extension kit.

BACKGROUND OF THE INVENTION

The type of surfaces over which a vehicle is ridden significantly affects its capacity and efficiency.

While the riding behavior is one of the most important aspects involved in the concept of most vehicles, the ability to allow interchangeability of parts or to retrofit new components on existing vehicles greatly satisfies the owner of vehicles and represents an interesting market source for vendors of specialized parts destined to vehicles such as All-Terrain vehicles (hereinafter "ATV"), light trucks, jeeps, etc.

Specialized parts for those vehicles include carrying cases, winches, plow assemblies just to name a few. These kits may develop the vehicle's capacity to accomplish other functions, to extend its duration of use throughout the seasons or to allow the use of the vehicle under different riding conditions.

For instance, different riding or traction kits (hereinafter, "traction kits") are sometime installed to replace the wheels of existing all-terrain vehicles. In principle, the kits should minimize the need to change existing components, must be able to fit on the vehicle without interference and should try to minimize any negative change to the overall riding behavior of the vehicle and comfort of the driver.

However, since most vehicles are not initially designed to be used with these traction kits, the overall behavior and/or characteristics of the vehicle can be affected when equipped with one of these kits. Even though these traction kits generally improve traction and weight distribution, they can alter other characteristics such as steering or power transfer.

For example, some ATVs are specifically designed such that the power and torque are not equally distributed among the front and rear wheels. An example of such a vehicle is the Polaris™ Sportsman™ ATV wherein the front wheels receive 80% of the power that is sent to the rear wheels. In other words, the front wheels do not actively contribute to the propulsion of the vehicle as long as the rear wheels do not spin or slip as to lose 20% of their traction power. In practice, this creates a two wheel drive vehicle that automatically becomes a four wheel drive vehicle when the rear wheels slip or spin beyond a certain threshold. This aspect is really appreciated by the drivers.

However, when equipped with traction kits such as the one disclosed in U.S. Pat. No. 6,006,847, the traction kits replacing the rear wheels rarely "spin" or lose traction since the traction kits improve the traction. Therefore, the front wheels or kits are rarely used to their full capacity and the ATV remains effectively a two "wheel" drive vehicle.

Another problem with traction kits, especially for ATVs, can be the limited width of the vehicles. Indeed, equipped or not with traction kits, the width of ATVs is usually limited to about 52 inches. If the traction kit equipped vehicle is wider, it would not fit into the pickup bed of a standard pickup truck or in some trailers. Moreover, when the vehicles are too wide, they are prohibited in certain trails. This total width limitation thus limits the width of the traction band that can be used with these traction kits.

However, larger and/or longer traction bands could be beneficial since they would provide larger contact areas with the ground, thus distributing the weight of the vehicle over a larger area. The improved weight distribution would create less pressure on the ground and more particularly, on the snow. The vehicle would thus have a lesser tendency to sink in soft terrain and would be more stable.

The installation of traction kits on vehicles and especially ATVs can also affect the steering capabilities of the vehicles. Indeed, the traction band of these traction kits has a much larger contact area with the ground than regular tires. Thus, when these kits replace the front wheels of a vehicle, it might be more difficult to turn the vehicle since the larger contact area creates more friction with the ground.

Therefore, upon installation of these traction kits, some vehicle parameters like steering, weight distribution or vehicle characteristic like width may be affected.

Numerous traction kits have been proposed throughout the years. In "Wheel Mount Track Conversion Assembly" (U.S. Pat. No. 5,607,210 issued on Mar. 4, 1997), Brazier proposes a traction kits to replace the wheels of wheeled vehicles. His system further comprises an anti-torque system that prevents the kit from contacting the vehicle. Though it can be easily mounted on a wheeled vehicle, the system of Brazier does not solve the problems mentioned above.

In "Endless Track Structure for Light Wheeled Vehicle" (U.S. Pat. No. 6,006,847 issued on Dec. 28, 1999), Knight proposes an improved sprocket wheel shaft and idler wheels suspension system.

In "Conversion system for all terrain vehicles" (U.S. Pat. No. 6,095,275 issued on Aug. 1, 2000), Shaw proposes an ATV equipped with conversion kits such as ski assemblies and traction assemblies to replace existing wheels. Although adapting to the existing power system, the conversion system does not provide adjustability means for the weight distribution of the vehicle, such that the ATV's weight is dispersed to the ground surface through the traction and ski assemblies.

In "Track Assembly for All-Terrain Vehicle" (U.S. Pat. No. 6,874,586 issued on Apr. 5, 2005), Boivin et al. disclose a traction kit wherein only a fraction of the traction band is in contact with the surface when this surface is flat.

As we can see, many traction kits have been proposed but yet, none of them have solved the problems mentioned above.

There is therefore a need for a traction assembly which improves riding condition when traction assemblies are used to replace existing wheels on vehicles.

OBJECTS OF THE INVENTION

Accordingly, an object of the present invention is to provide an improved traction assembly for a vehicle which uses an endless traction band.

Another object of the present invention is to provide a traction assembly which can improve the power and torque transmission ratio.

Another object of the present invention is to provide a traction assembly which can allow for the installation of wider traction bands.

Another object of the present invention is to provide a traction assembly which can allow for the installation of longer traction bands.

Another object of the present invention is to provide a traction assembly which can improves and facilitates steering.

Other and further objects and advantages of the present invention will be obvious upon an understanding of the illustrative embodiments about to be described or will be indicated in the appended claims, and various advantages not referred to herein will occur to one skilled in the art upon employment of the invention in practice.

SUMMARY OF THE INVENTION

To attain these and other objects which will become more apparent as the description proceeds according to one aspect of the present invention, there is provided an improved traction assembly.

The object of the present invention involves a traction assembly that can preferably replace a wheel on vehicle. The traction assembly thus involves a vehicle with a frame and at least one traction axle. Preferably, the traction assembly can replace wheels on either side of the front portion and/or the rear portion of the vehicle.

More particularly, the traction assembly includes a sprocket wheel and a longitudinally extending traction band cooperating with such sprocket wheel. The sprocket wheel is preferably fixedly attached by means known in the art to the traction axle (or the wheel hub) of the vehicle. The traction assembly also comprises a support structure or frame, preferably in the form of a slider bar on which at least one but preferably two idler wheels are mounted. These idlers wheels are preferably mounted at the extremities of the support structure. A plurality of road wheels can also be mounted on either side and along the support structure to increase the stability of the traction band.

In one embodiment of the present invention, the traction kit installed on the front and the rear wheels of a vehicle are substantially the same except for one characteristic. In this embodiment, the sprocket wheels of the traction kits used to replace the rear wheels of a vehicle have a number of sprocket teeth which is different from the number of sprocket teeth of the wheels used on the front traction kits. This difference in sprocket teeth number allows for an improved power and torque transmission for certain vehicles.

It is to be understood that different uses or different vehicles may require different front and rear sprocket teeth number.

In another embodiment of the present invention, the sprocket wheels of preferably the rear traction assemblies comprise radially extending teeth. However, these teeth are laterally offset toward the vehicle. This offset allows the use of a wider traction band on the rear traction assembly without increasing the total width of the vehicle. Wider traction bands allow for better traction and better weight distribution.

In still another embodiment of the present invention, the frame of the traction kit can be equipped with a frame extension which extends the total length of the traction kit. This longer traction kit can therefore support longer traction bands. This lengthened traction kit is preferably installed on the rear axle of the vehicle since it requires more space. The extension is also preferably, but not necessarily, pivotally mounted of the frame of the traction kit in order for the extended traction kit to follow the variations in the ground surface.

In yet another embodiment of the present invention, the traction assembly further comprises an anti-torque device. The anti-torque device comprises:

a) a first elongated bracket having first end and second end, the first end comprising first pivotable attachment means and the second end comprising first generally transverse abutting means;

b) a second elongated bracket having third end and fourth end, the second bracket being generally slidingly mounted on the first bracket, the third end comprising second generally transverse abutting means and the fourth end comprising second pivotable attachment means, the third end being generally located between the first and second end of the first bracket;

c) a first resilient means located between the first generally transverse abutting means and the second generally transverse abutting means;

d) a third generally transverse abutting means located between the second end of the first bracket and the fourth end of the second bracket;

e) a second resilient means located between the first generally transverse abutting means and the third generally transverse abutting means;

wherein extension of the anti-torque device is countered by the first resilient means and wherein compression of the anti-torque device is countered by the second resilient means.

The anti-torque device further comprises adjustment means such that the traction assembly can be biased in a predetermined position when the vehicle is in a stable position.

The traction assembly is preferably installed on an All-Terrain Vehicle (ATV). However, the traction assembly could also be installed on other traction axle equipped vehicles such as light trucks and jeeps.

Other aspects and many of the attendant advantages will be more readily appreciated as the same becomes better understood by reference to the following detailed description and considered in connection with the accompanying drawings in which like reference symbols designate like elements throughout the figures.

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 4 is a close up view of the ball joint assembly of the anti-torque system.

FIGS. 5a-5c are schematic views of the functioning of the anti-torque system.

FIG. 8 contains side and sectional views of the sprocket wheel of the prior art.

DETAILED DESCRIPTION OF THE PREFERRED EMBODIMENT

Figure 1:
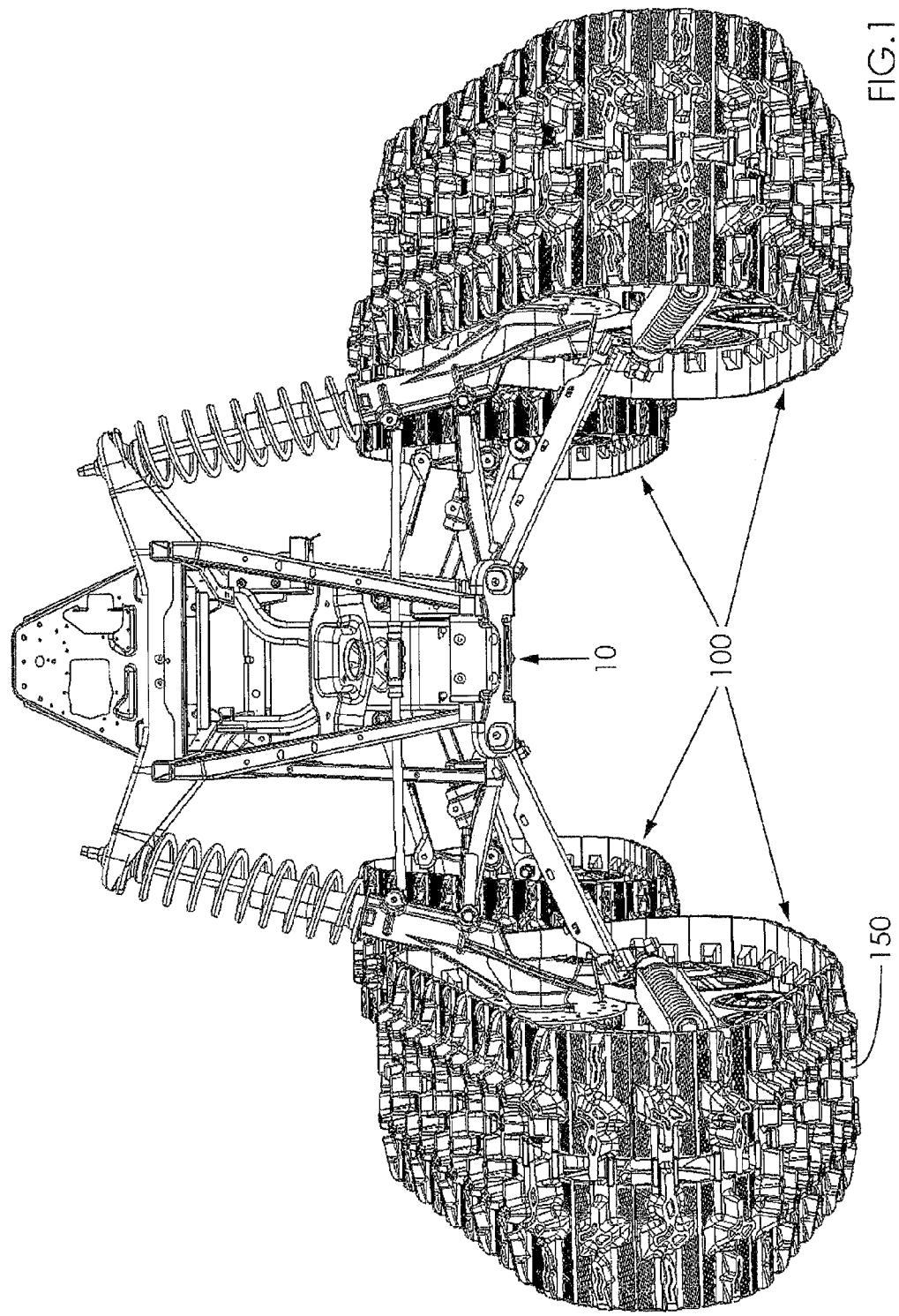
FIG. 1 is a front view of the underside of an ATV equipped with traction kit with the anti-torque system.

The present invention relates to a traction assembly for a vehicle using an endless traction band and a plurality of wheels for propulsion on irregular terrains.

Anti-Torque System

FIGS. 1 to 4 show a first preferred embodiment of the present invention. In FIGS. 1-4, we can see an ATV 10 wherein its front and rear wheels (not shown) have been replaced by traction assemblies 100. The traction assembly 100 generally comprises a frame structure 120 which supports a sprocket wheel 110, preferably a plurality of additional wheels 130 (road wheels) and 140 (idler wheels). The frame structure 120 also supports a slider bar. A track 150, preferably made of rubber and/or reinforced rubber is tensioned around the sprocket wheel 110, the road wheels 130 and the idler wheels 140. The track 150 further comprises a series a longitudinally aligned holes (not shown), preferably in the center of the track, which cooperate with the teeth of the sprocket wheel for transmission of the power from the axle to the track 150. The space defined between two consecutive holes preferably support a metal clip (not shown) to reduce the friction between the track 150 and the slider bar.

The frame structure 120 further supports anti-torque system 160. Generally speaking, the anti-torque system 160 is pivotally mounted, at one end, on the frame structure 120 of the assembly 100 and, at the other end, pivotally mounted under the frame of the vehicle 10, preferably on the suspension table 11.

Figure 2:
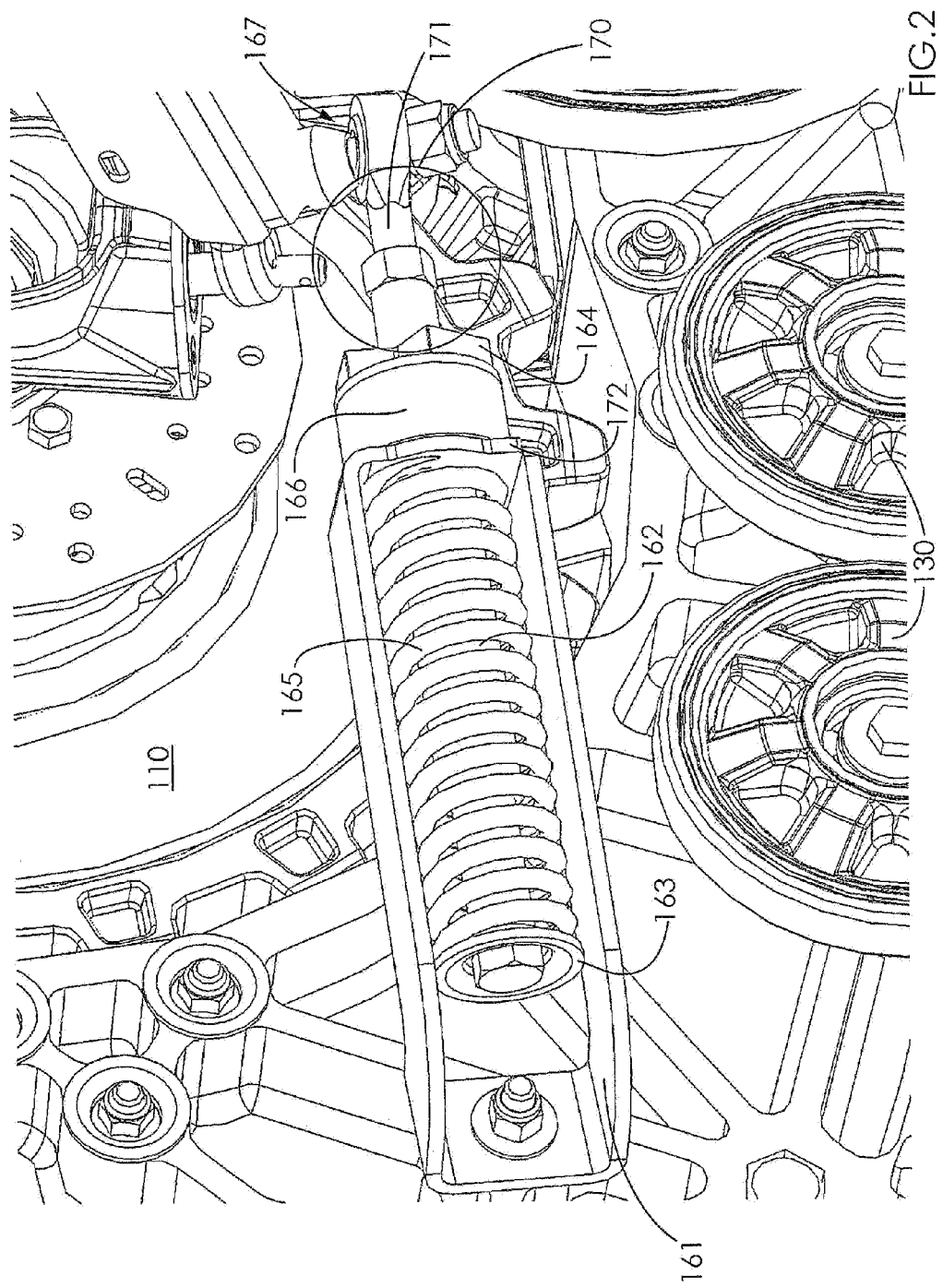
FIG. 2 is a side view of the anti-torque system.
Figure 3:
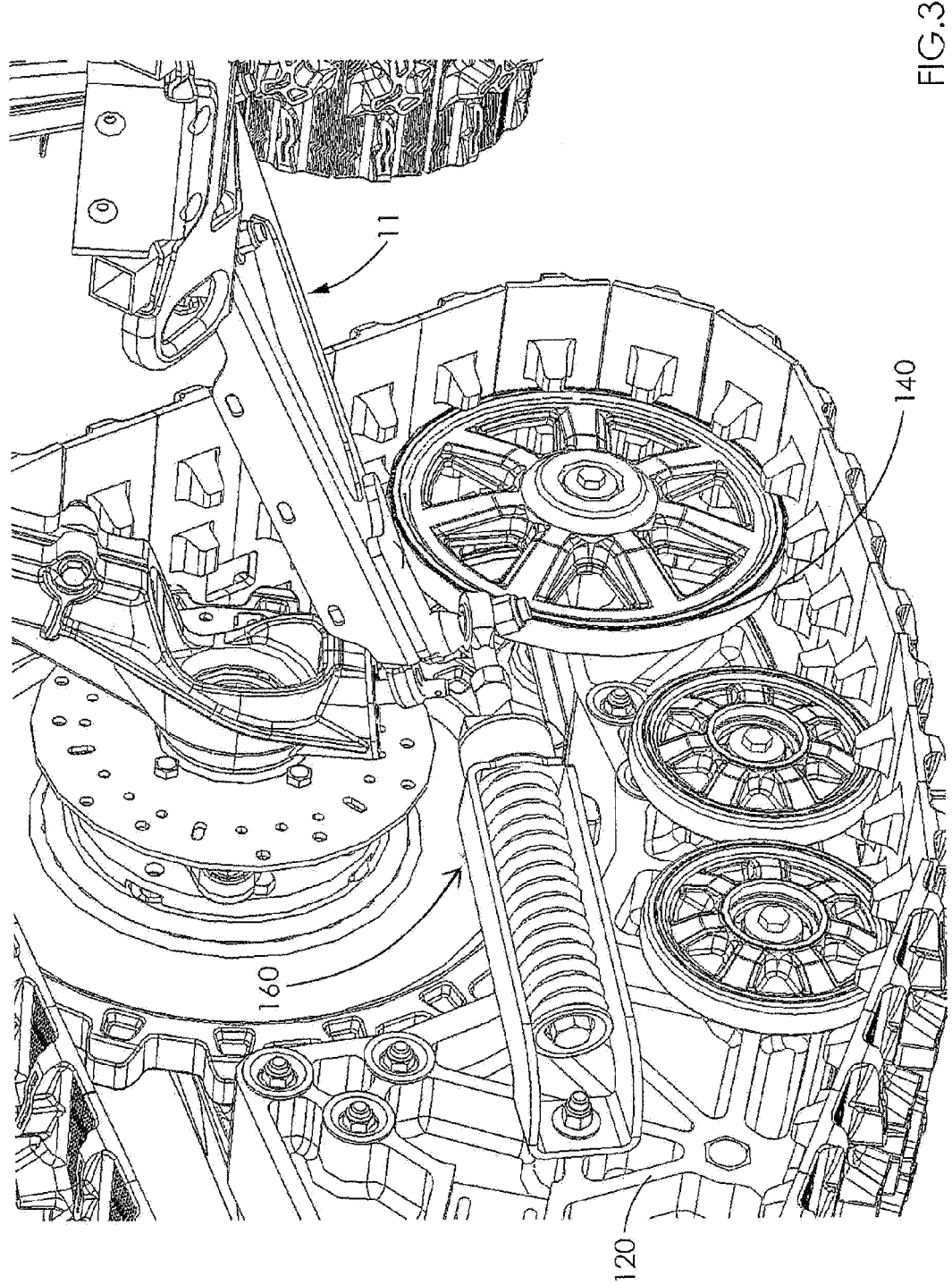
FIG. 3 is an isometric view of the anti-torque system as installed on the traction assembly.

The anti-torque system 160 is pivotally mounted on the frame structure 120 of the traction assembly 100 using bracket 161 and a bolt and nut assembly. As shown in FIGS. 2 and 3, the bracket 161 is an elongated structure, preferably made of metal and defining a hollow interior space. The shape of the bracket 161 shown in FIGS. 1-4 is given for example purpose only and is by no means limitative in nature. Other shapes carrying equivalent function could be used instead.

The first end of bracket 161 is adapted to be mounted on frame structure 120 of the assembly 100. The second end of bracket 161 comprises a transverse wall 172 having a hole generally in its center.

The bracket 161 is coupled to an elongated rod 162 which extends "in" and "out" of the bracket 161 via the hole of the transverse wall 172. Thus, a fraction of the rod 162 extends inside the hollow space defined by the bracket 161 whereas the remaining fraction extends outside. Located along the rod 162 are two transverse abutting plates 163 and 164. Abutting plate 163 is located on the fraction of the rod 162 located inside the hollow space defined bracket 161 whereas abutting plate 164 is located on the fraction of the rod 162 located outside bracket 161. Abutting plate 163 is preferably located at the end of the rod 162. Also, abutting plates 163 and 164 are preferably fixedly attached to the rod 162.

Located between abutting plate 163 and the transverse wall 172 and generally coaxially mounted with rod 162 is a spring 165 or other equivalent resilient means. The spring 165 generally abuts on abutting plate 163 and the transverse wall 172. The spring 165 is thus located inside the hollow space defined by the bracket 161.

Located between abutting plate 164 and the transverse wall 172 and generally coaxially mounted with rod 162 is a resilient bushing 166 or other equivalent resilient means. It is to be understood that the resilient busing 166 is located outside the bracket 161. The bushing 166 is preferably made of rubber but the use of other materials can be contemplated. As used herein, the word "rubber" includes any elastic and primarily non metallic materials such as rubber, elastomers and/or combinations thereof. Furthermore, the use of equivalent resilient means such as a spring can also be envisaged without departing from the scope of the invention.

The end of the rod 162 which extends outside the bracket 161 further comprises a ball joint assembly 167 which is pivotally attached to the vehicle 10, preferably to the suspension table 11, during use. The ball joint assembly allows for three-dimensional movements of the anti-torque system 160.

The rod 162 also comprises length adjustment means 170 located at the end located outside the bracket 161. This end of the rod 162 comprises a preferably coaxial threaded bore. The ball joint assembly 167 comprises a threaded appendix 171 which is screwed inside the threaded bore. The accidental screwing or unscrewing of the appendix 171 is prevented by a nut. This threaded appendix 171 and the coaxial bore are the adjustment means 170.

Length adjustment means 170 allow to increase or reduce the length of the anti-torque device 160, by unscrewing or screwing appendix 171. If the appendix is unscrewed, the device 160 is lengthened. Conversely, if appendix 171 is further screwed inside the threaded bore, the device 160 is shortened.

As can be seen in FIGS. 1-4, the anti-torque system is preferably mounted under the axle of the sprocket wheel 110.

Figure 5B:
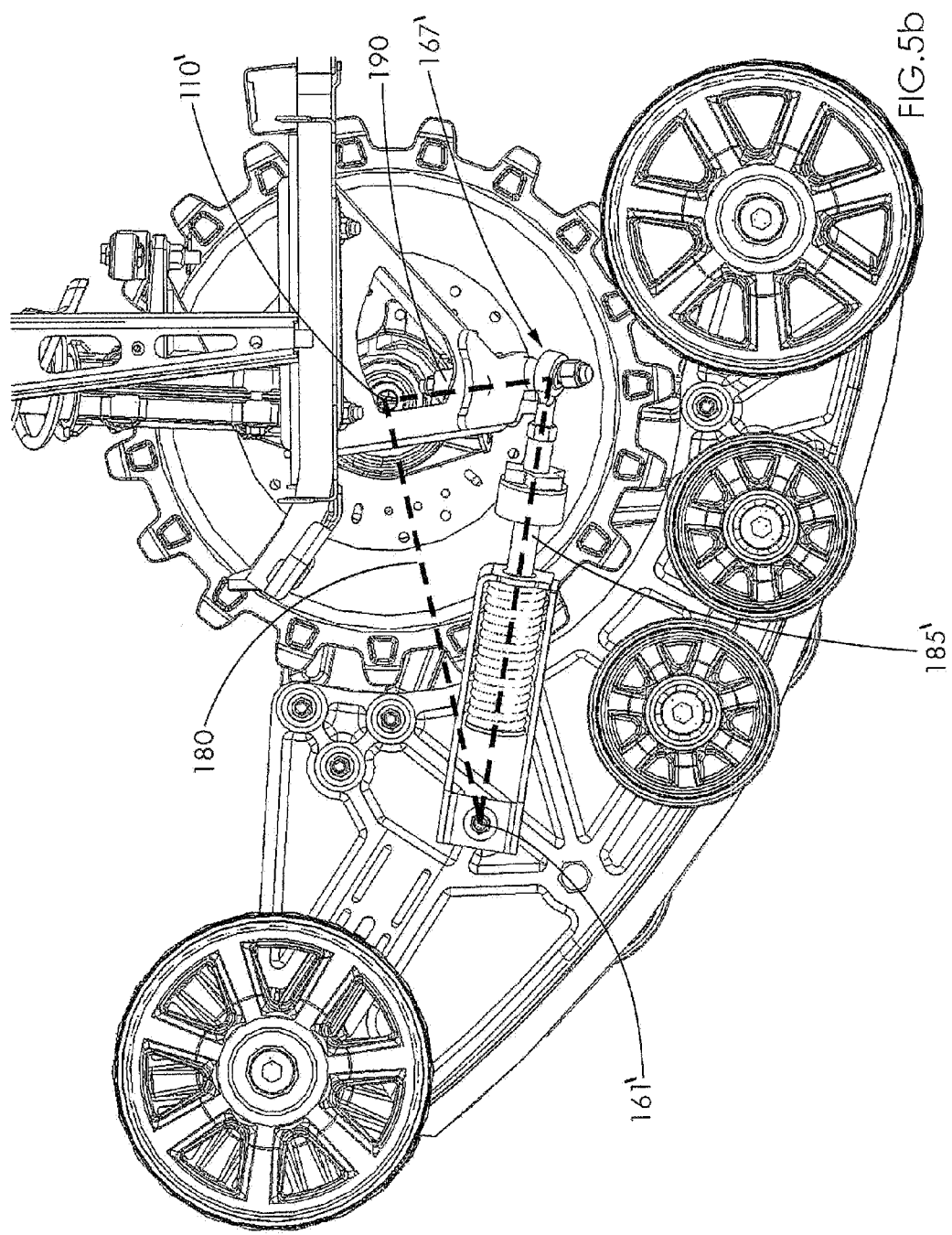

FIGS. 5a to 5c show schematically how the anti-torque system functions. Element 110' is the axis of rotation of the sprocket wheel 110. Element 167' is the axis of rotation of the ball joint assembly 167. Element 161' is the axis of rotation of the bracket 161.

Distance 180 is the distance between the axis of rotation 110' and the axis 161'. Distance 180 is decided upon installation of the anti-torque system 160 and is invariable thereafter.

Distance 190 is the distance between the axis of rotation 110' and the axis of rotation 167'. Distance 190 is decided upon installation of the anti-torque system 160 and is invariable thereafter.

Distance 185 is the distance between the axis of rotation 161' and the axis of rotation 167'. Distance 185 varies with the movement of the traction assembly 100 around the axis of rotation 110' of the sprocket wheel 120.

When the vehicle 10 is on a flat surface, the ground contacting area of the traction band is substantially parallel to the general direction of the vehicle 10 and there is no danger that the traction assembly 100 may contact the vehicle 10. This is shown in FIG. 5a.

However, when the vehicle is driving on uneven terrain, the traction assembly or assemblies 100 will try to follow the bumps and depressions of the terrain. When facing a bump, the front portion of the traction assembly 100 and thus the axis of rotation 161' will rise as shown in FIG. 5b. Since distances 180 and 190 are fixed, only distance 185 and thus, the length of the anti-torque system 160 can change. In this case, distance 185 will extend to distance 185' (185'>185). However, if we were to allow the anti-torque system 160 to extend freely, the front portion of the traction assembly would eventually contact the frame of vehicle 10, which should be avoided at all cost to prevent damages. Thus, when the anti-torque system 160 is elongated, the spring 165, located between abutting plate 163 and the bracket 161 transverse wall 172 is compressed. By trying to return to its original shape, the compressed spring 165 creates a counter force that pushes back the traction assembly to its stable position, i.e. distance 185, effectively preventing the traction assembly 100 to contact the vehicle 10.

When the traction assembly 100 faces a depression, the front portion of the traction assembly and thus the axis of rotation 161' will descend as shown in FIG. 5c, to follow the configuration of the terrain. As for the previous situation, only distance 185 and thus, the length of the anti-torque system 160 can change. However, in this case, to maintain the structural integrity of the traction assembly 100, the length of the anti-torque system 160 must reduce to 185" (185"<185). In this case, it is resilient bushing 166, located between the bracket 161 transverse wall 172 and the abutting plate 164 that is compressed. As for the compressed spring 165, the compressed bushing 166 creates a counter force that pushes back the traction assembly 100 to its stable position, i.e. distance 185. The resilient bushing 166 also physically limits the shortening of the anti-torque system 160 since it is impossible to compress the bushing 166 beyond a certain limit.

It is to be noted that the spring 165 cannot be compressed beyond a certain physical limit. However, if the user wants to further limit the compression of the spring 165, a limiter may be added in the device 160. The limiter, in a preferred embodiment, comprises a tube generally coaxially mounted on the fraction of the rod 162 located inside the bracket 161. The length of the tube must however be shorter that the fraction of the rod 162 extending inside de bracket 161 when the device 160 is in equilibrium position. The compression of the spring 165 is then limited to the length difference between the length of the tube of the limiter and the length of the fraction of the rod 162 extending inside the bracket 161. The length of the tube can hence be chosen according to the preference of the user.

One of the main advantages of this anti-torque system 160 is the fact that the "stable length" or distance 185 is adjustable via length adjustment means 170. These length adjustment means 170 allows the user of the system to create bias in the anti-torque system 160 and thus, in the position of the assembly 100.

If, for example, the length of the rod 162 is lengthened, the front portion of the assembly will "rise" and slightly move forward. This small forward displacement effectively modifies the caster angle of the assembly.

It is known in the art that the caster angle has a direct impact on the steering capability of a vehicle. Thus, by artificially changing the caster angle of the assembly 100, the anti-torque system 160 can improve the steering capability of the vehicle 10.

It is also to be understood that reducing the length of the anti-torque system 160 with the use of the length adjustment means 170 will also modify the caster angle of the assembly 100.

Figure 6:
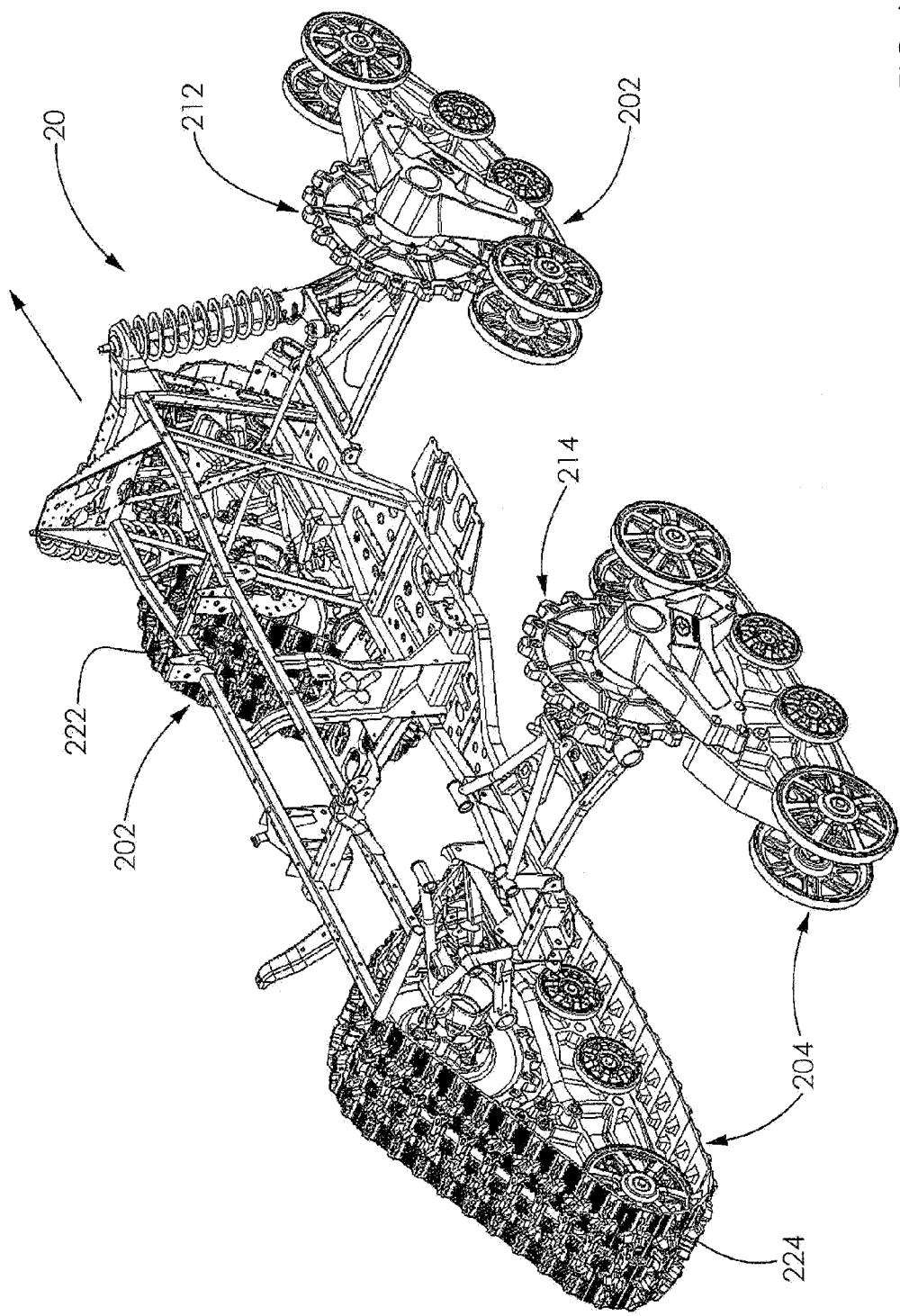
FIG. 6 is an isometric view of the power train and wheels of an ATV equipped with traction assemblies.

The degree of length adjustment is limited by the length of the threaded appendix 171.
Sprocket Wheel Ratio In FIG. 6, we can see a second preferred embodiment of the present invention. In this figure, we only see the frame of the vehicle or ATV 20. The ATV 20 is equipped with two front traction kits 202 and two rear traction kit 204. The general construction details of these traction kits 202 and 204 are known in the art and need not be described here.

However, each traction kit 202 and 204 needs to comprise a sprocket wheel 212 and 214 respectively.

The power train (not shown) of the ATV 20 distributes the power and torque to the front and rear wheels (not shown) according to some specific ratio defined by the manufacturer.

For the sake of this description, let assume that the rear wheels receive 100% of the power whereas the front wheels receive 80% of the same power. In normal use, the front wheels are effectively "dragged" along since the rear wheels receive more power, effectively pushing on the ATV 20. However, when the rear wheels slip or spin such that they lose 20% or more of their power, it is the front wheels that now have most of the power, effectively pulling on the ATV 20 until the rear wheels stop slipping or spinning and recover their power.

When identical traction kits are installed to replace all the wheels of the ATV 20, this power transmission scheme of the power train is practically never used. Indeed, since the rear traction kits 204 rarely spin or slip, it implies that the front kits 202 never actively participate in the propulsion of the vehicle 20.

The transmission of power from the rear axle (not shown) to the traction band 224 is done via the sprocket wheel 214. In a similar manner, the transmission of power from the front axle (not shown) to the traction band 222 is done via sprocket wheel 212. We can thus approximate the power sent to the traction band 224 by multiplying the power by the number of sprocket teeth.

For example, let assume that rear sprocket wheel 214 has 18 teeth and that front sprocket wheel 212 has also 18 sprocket teeth. Using the normal power transmission ratio of 100%-80%, we obtain the following relation:

$$100*18 \leftrightarrow 80*18 \tag{1}$$

By dividing both sides of the relation by 18, we retrieve the 100%-80% ratio.

Since the 100%-80% ratio is built in the power train, if we want to artificially change the ratio, we must change the size of the sprocket wheel. Thus, let say we put a 19 teeth sprocket wheel in the front traction kit. The relation will now be:

$$100*18 \leftrightarrow 80*19 \tag{2}$$

By isolating 100 in the left hand side term, we obtain:

$$100 \leftrightarrow (80)*(19/18) \tag{3}$$

$$100 \leftrightarrow 80*1.06 \tag{4}$$

$$100 \leftrightarrow 84 \tag{5}$$

Thus now, the front kits 202 will cooperate to the propulsion of the ATV 20 when the rear traction kits 204 lose only 16% of their power as opposed to the original 20%.

The skilled addressee will understood that it is possible to change both front 212 and rear 214 sprocket wheels if the user wants another modified ratio.

A rear sprocket 214 of 17 teeth used with a front sprocket 212 of 19 teeth would create a power ratio of:

$$100 \leftrightarrow 80*(19/17) \tag{6}$$

$$100 \leftrightarrow 80*1.12 \tag{7}$$

$$100 \leftrightarrow 90 \tag{8}$$

The skilled addressee will also understand that by installing a front sprocket wheel 212 smaller than the rear sprocket wheel 214, the power ratio will be modified accordingly. For example:

$$100*18 \leftrightarrow 80*17 \quad (9)$$

$$100 \leftrightarrow 80*(17/18) \quad (10)$$

$$100 \leftrightarrow 80*0.94 \quad (11)$$

$$100 \leftrightarrow 75 \quad (12)$$

Thus, by installing traction kits wherein the number of teeth of the sprocket wheels 212 of the front kits 202 differs from the number of teeth of the sprocket wheels 214 of the rear traction kits 204, it is possible to alter the power transmission ratio built in the power train 25.

It is also to be understood that the ratio 100%↔80% was given for example purpose only. Different manufacturers may have different power train ratio and therefore, the choice of sprocket wheels must be done accordingly.

Sprocket Wheel with Offset Teeth

Figure 7A:
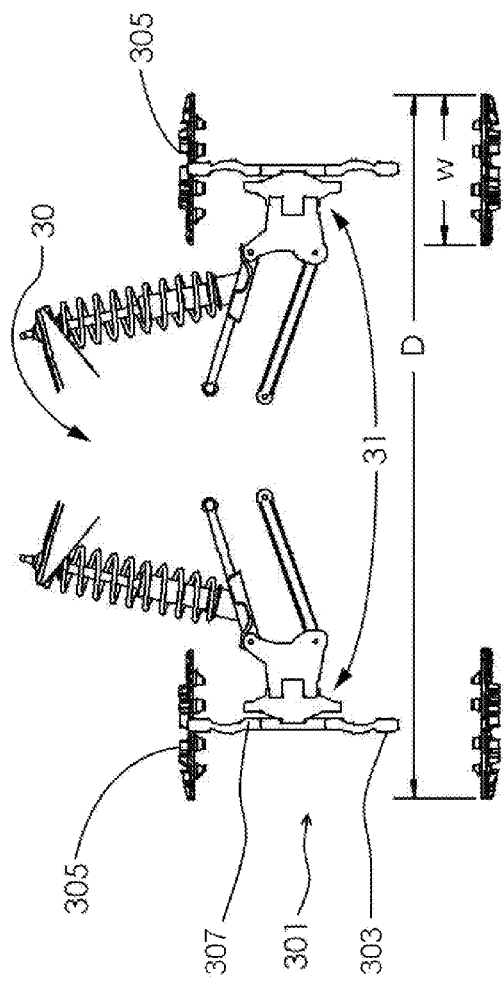
FIGS. 7a and 7b are partial top views of the traction assemblies of the prior art and of the present invention.
Figure 7B:
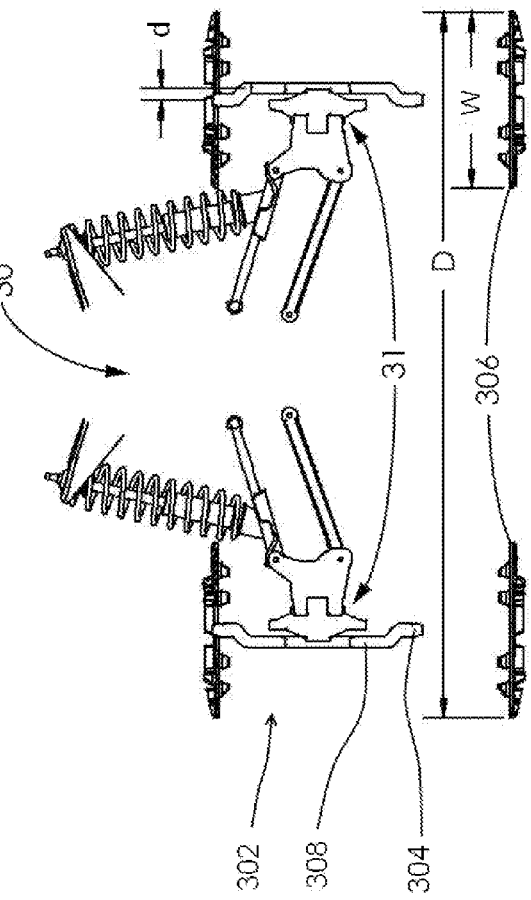

FIGS. 7a and 7b shows a third preferred embodiment of the present invention.

In FIG. 7a, we can see a traction kit 300 as usually designed in the prior art. The wheels of the vehicle or ATV 30 are replaced by traction kits 300. The sprocket wheels 301 are mounted on the wheel hubs 31 of the vehicle 30 using method and means known in the art.

As shown in FIG. 8, in the prior art, the teeth 303 of the sprocket wheels 301 are aligned with the plane of rotation of the central wheel portion 307 of the sprocket wheel 301. The central wheel portion 307 is configured to be mounted to the wheel hub 31 of the vehicle 30. In that sense, the central wheel portion 307 is provided with a series of openings 309.

Returning to FIG. 7a, we can see that this configuration limits the width of the traction band 305 that can be used with the traction kit 300. More precisely, to remain in the preferred 52 inches (132.08 cm) limit for the total width D of the vehicle 30, the width of the traction band 305 was usually limited to width w of 11.5 inches (29.21 cm).

In the preferred embodiment shown in FIG. 7b, we can see that the teeth 304 of the sprocket wheels 302 are laterally shifted with respect to the central wheel portion 308 of the sprocket wheel 302. More particularly, the sprocket teeth 304 are laterally displaced toward the vehicle 30. Understandably, in this preferred embodiment, the sprocket teeth 304 generally rotate in a plane different from the rotation plane of the central wheel portion 308.

Figure 9:
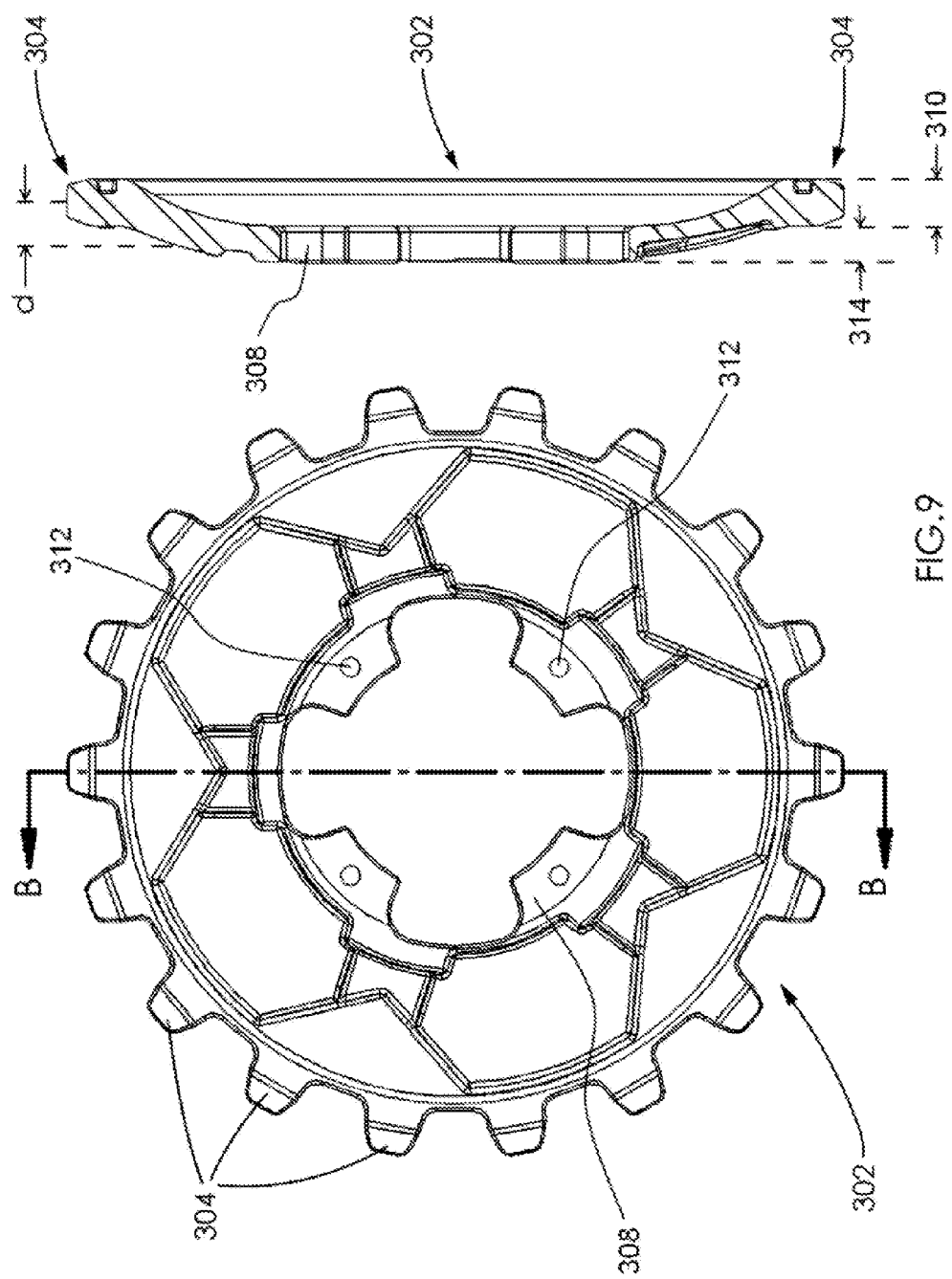
FIG. 9 contains side and sectional views of the sprocket wheel of the present invention.

FIG. 9 shows in more details the sprocket wheel 302 of the present invention. As indicated above, the sprocket wheel 302 comprises a central wheel portion 308 generally configured (via holes 312) to be secured to the vehicle 30, typically to the wheel hub 31 thereof, and a plurality of radially extending sprocket teeth 304 configured to conventionally engage the holes (not shown) formed in the body of the traction band 305/306. The sprocket teeth 304 and the central wheel portion 308 respectively have width 310 and 314. As illustrated in FIG. 9, the sprocket teeth 304 are laterally offset with respect to the central wheel portion 308 by an offset distance d, which can typically be around 1 inch (2.54 cm). Preferably, though not exclusively, the offset distance d corresponds to the width 310 of the sprocket teeth 304 such that the width 310 of the sprocket teeth 304 does not substantially overlap the width 314 of the central wheel portion 308. The offset distance d allows the use of wider traction band 306 since the offset reduce the effective total width by 2*d. Indeed, by having sprocket teeth 304 offset toward the vehicle by a distance d, the sprocket wheel 302 effectively shifts the traction band toward the vehicle by the same distance d. If d is 1 inch (2.54 cm), then the total width D of the vehicle 30 would be 50 inches if we use prior art traction bands 305. We can thus widen traction band 306 by at least d (1 inch or 2.54 cm) toward the exterior and possibly d (1 inch or 2.54 cm) toward the interior in order to have symmetric and balance traction bands 306 of a width W of 13.5 inches (34.29 cm).

Thus, by offsetting the teeth 304 of the sprocket wheels 302 with respect to the central wheel portion 308 thereof, we can use wider traction band 306. Wider band 306 implies larger contact area and thus, an improved weight distribution and a better traction. Wider bands 306 also imply a more stable vehicle 30.

Traction kits 300 with comprising sprocket wheels 302 of the present invention are preferably but not exclusively used to replace only the rear wheels of the vehicle or ATV 30. Larger traction band 306 in the front of the ATV 30 could indeed hinder the steering capabilities of the ATV 30.

Frame Extension

Figure 10:
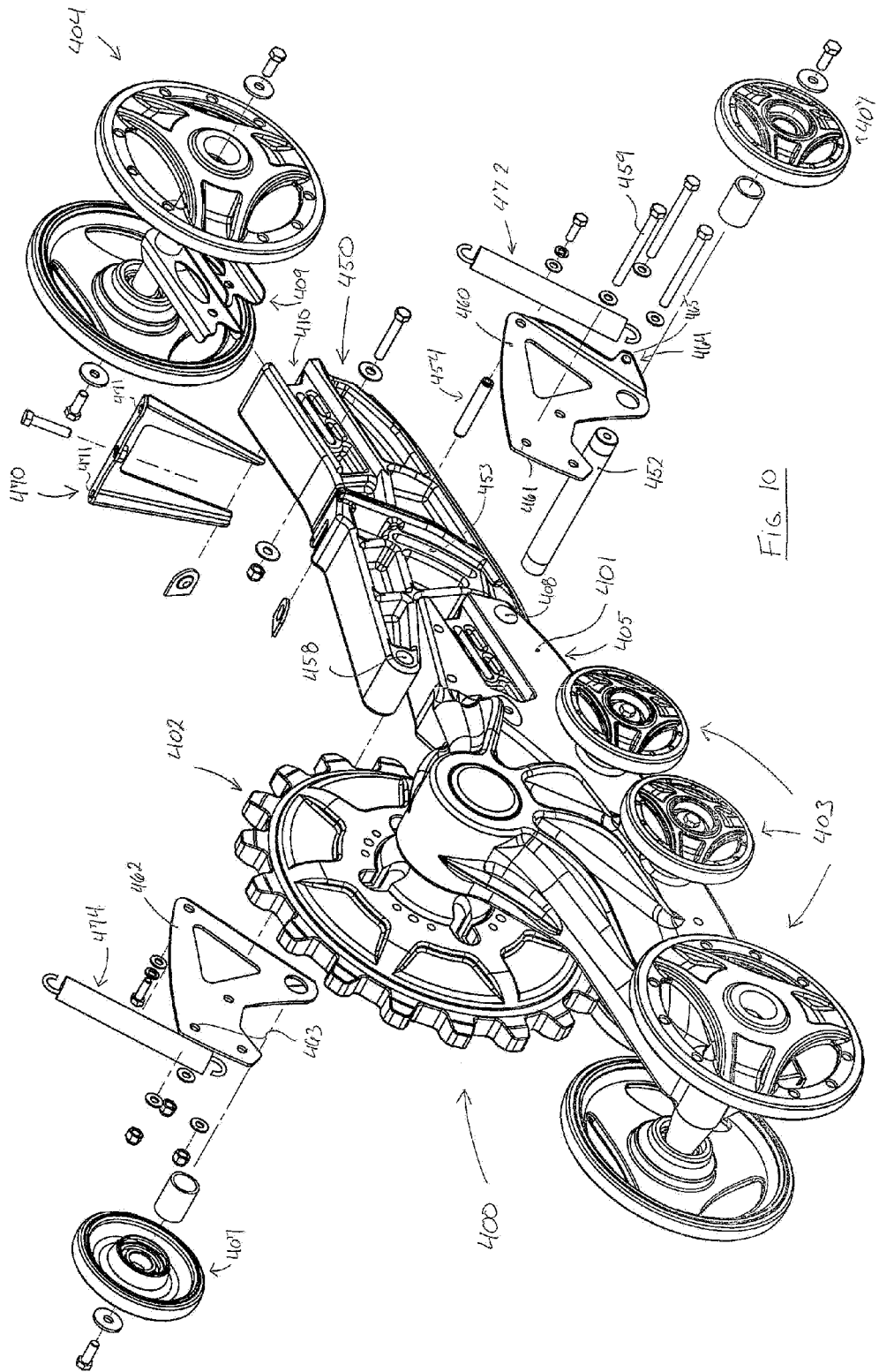
FIG. 10 presents an exploded perspective view of the traction kit with the frame extension.

In FIG. 10, we can see an exploded view of another embodiment of the present invention. The traction kit 400 of this embodiment comprises a frame structure 401 which in turn supports a sprocket wheel 402, pivotally mounted of the frame structure 401, a plurality of road wheels 403 and tension wheels 404. A traction band (not shown), preferably made of rubber or reinforced rubber, although other material could be used, is tensioned around the sprocket wheel 402, the road wheels 403 and the tension wheels 404. The lower part of the frame structure 401 can also support a slider bar 405 onto which the traction band can slide.

In the preferred embodiment shown in FIG. 10, the tension wheels 404 are removed from the traction kit 400 and replaced by the frame extension member 450. It is to be understood that the tension wheels 404 were mounted on the frame structure 401 via a tensioning assembly 409. Tensioning assemblies are known in the art and will not be described any further.

The frame extension member 450 is pivotally mounted onto the frame structure 401 via mounting plates 460 and 462 and bolt or rod 459. The bolt 459 passes through aperture 458 of the frame extension 450 and apertures 461 and 463 of the mounting plates 460 and 462 respectively. The mounting plates 460 and 462 are also fixedly attached to the frame structure 401 via bolts and nuts assemblies or other equivalent fastening means. The bolt 459 thus defines a pivot point around which the frame extension member 450 can at least partially pivot. This pivot point also permits the elongated traction kit 400 to follow the bumps and depressions of the ground on which the vehicle is driven.

A rod 452 can further support a pair of supplemental road wheels 407 which are installed on either side of the rod 452. These road wheels 407 are mounted on the rod 452 via bushings and bolt and nut assemblies. These road wheels 407 increase the support and stability of the traction band (not shown).

To prevent excessive pivotal movement of the frame extension member 450 around the bolt 459, the frame extension 450 preferably further comprises an arcuate aperture 453. A small rod 454 is inserted through this aperture 453 and is further fixedly mounted on the mounting plates 460 and 462 via nuts and bolts assemblies or other equivalent fastening means. The frame extension is thus limited in its pivotal movement by the rod 454 which will abut at either end of the arcuate aperture 453 should the pivotal movement become excessive. The shape of the arcuate aperture 453 is chosen according to the specific shapes and dimensions of the frame structure 401 and the frame extension member 450.

Understandably, other means to prevent excessive pivotal movements of the frame extension member 450 could be used without departing from the scope of the invention.

To further limit the movement of the frame extension member 450 and to keep it in a preferred stable position, the frame extension member 450 can be further equipped with a mounting bracket 470. The mounting bracket 470 comprises at least two holes 471, one located on each side of the frame extension member 450. These holes 471 are used as attaching points for two springs 472 and 474. The springs 472 and 474 are then further attached to the mounting plates 460 and 462 via small ear 464 (only one is shown albeit each mounting plates 460 and 462 is equipped with an ear) which includes a corresponding hole 465.

Figure 11:
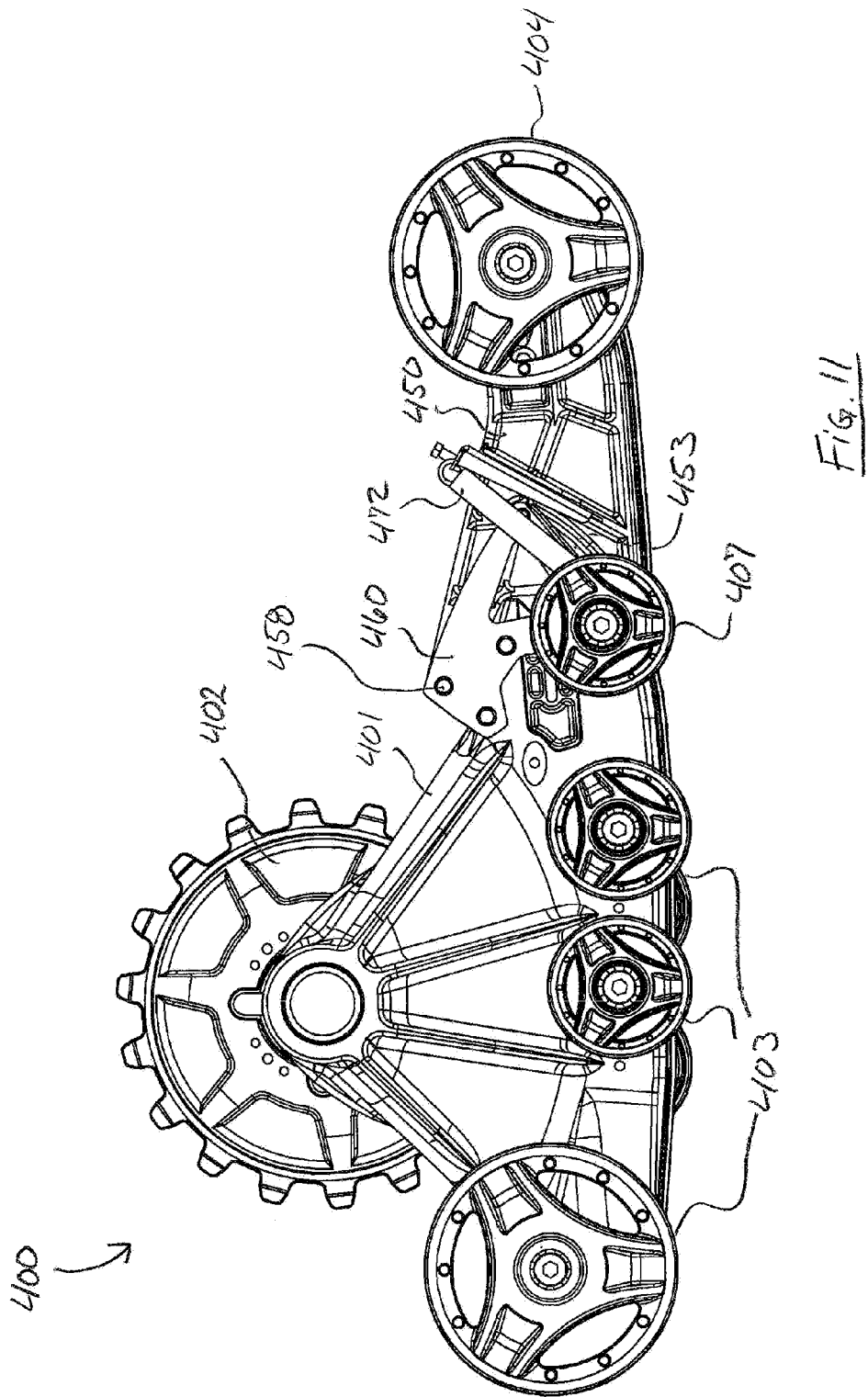
FIG. 11 is a side view of the traction with the frame extension in low position.
Figure 12:
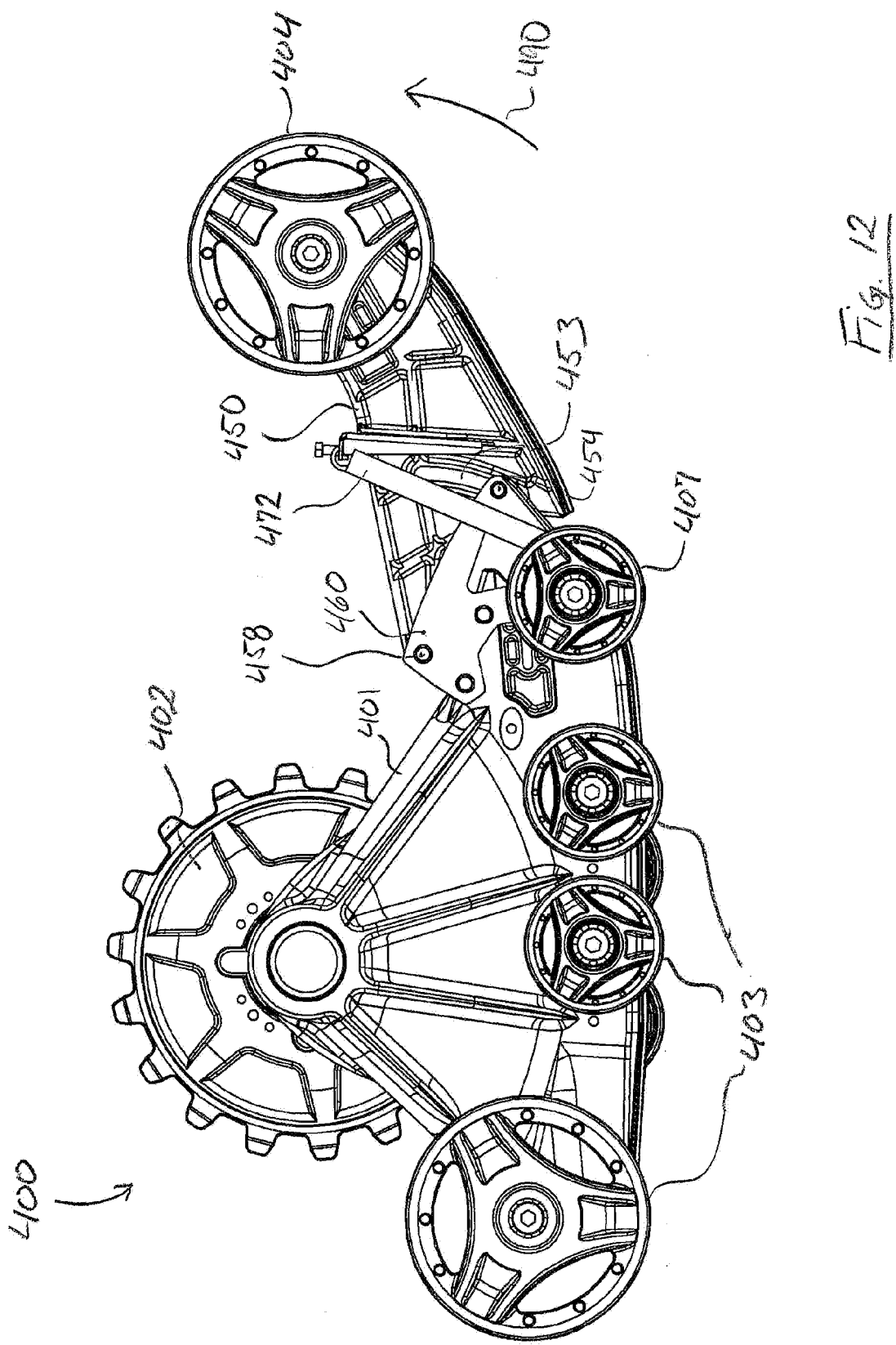
FIG. 12 is a side view of the traction with the frame extension in high position.

As best shown in FIG. 11, with this arrangement, when the frame extension is in stable position, the rod 454 abuts on the upper end of the arcuate aperture 453 and the springs 472 and 474 are at rest. In FIG. 12, when the frame extension 450 pivots upwardly (see arrow 490) about aperture 458 and bolt 459 and is in high position, rod 454 abuts in the lower end of the arcuate aperture 453, therefore limiting the amplitude of the pivotal movement. Moreover, as best shown in FIG. 12, as the frame extension pivots upwardly, the springs 472 and 474 are extended. When the force which produces the pivotal movement is removed, the springs 472 and 474, by virtue of their resiliency, will bring back the frame extension 450 to its stable position or low position as in FIG. 11.

This arrangement also acts as a complementary suspension system.

Should the frame extension member 450 not limited in its pivotal movement, the frame extension member 450 could create a momentum of force which could translate in excessive strain in the frame structure 401 which could ultimately break. Moreover, excessive pivotal movement of the frame extension 450 could also damage or even break the traction band (not shown).

Finally, the frame extension member 450 is further preferably equipped with means 410 to receive the tensioning assembly 409 used to support the tension wheels 404.

It is to be understood that the frame extension member 450 presented above was described according to a specific preferred embodiment. However, depending on the shape, dimension and design of the frame structure 401, the shape, dimension and design of the frame extension member 450 could change.

Furthermore, it is envisaged, even though not preferred, that the frame extension member 450 be fixedly attached to the frame 401 instead of being pivotally mounted.

Since the frame extension member 450 can be retrofitted on an existing traction kit, the frame extension can come in a frame extension kit which would comprise:
a frame extension member 450;
mounting means 460 and 462;
pivot means 459;
a correspondingly longer traction band;
The kit could further comprise:
at least one road wheel 407;
overpivoting prevention means 454;
resilient means 472 and 474.
All the necessary brackets and fastening means would also be included in the kit.

A method to retrofit frame extension kit described above to a traction kit 400 would comprise at least the following steps:
releasing the original traction band;
removing the original traction band from the traction kit 400;
removing the rear wheels 404;
installing the frame extension member 450;
installing the rear wheel 404;
installing the new longer traction band on the extended traction kit 400;
tensioning the new longer traction band.

The skilled addressee will obviously understand that other intermediate steps could be necessary given the particular traction kit 400 onto which the frame extension member 450 is installed.

Although preferred embodiments of the invention have been described in detail herein and illustrated in the accompanying figures, it is to be understood that the invention is not limited to these precise embodiments and that various changes and modifications may be effected therein without departing from the scope or spirit of the present invention.

The invention claimed is:

1. An anti-torque device for use in cooperation with a traction assembly for use on a vehicle, the vehicle having a frame, the traction assembly comprising a frame structure, a sprocket wheel, at least one additional wheel pivotally mounted on the frame structure, and a longitudinally extending traction band disposed around the sprocket wheel, the frame structure and the at least one additional wheel, the anti-torque device comprising:
a) a first elongated member comprising a first end and a second end, the first end being configured for pivotal attachment, the first elongated member comprising a first abutment structure;
b) a second elongated member comprising a third end and a fourth end, the second member being slidingly coupled to the first member such that the third end is substantially located between the first end and the second end, the fourth end being configured for pivotal attachment, the second member comprising a second abutment structure located between the third end and the second end, and a third abutment structure located between the fourth end and the second end;
c) a first resilient element located between the first abutment structure and the second abutment structure;
d) a second resilient element located between the first abutment structure and the third abutment structure;
wherein extension of the anti-torque device is substantially resiliently countered by the first resilient element and wherein compression of the anti-torque device is substantially resiliently countered by said the second resilient element.

2. An anti-torque device as claimed in claim 1, wherein the first end is being configured for pivotal attachment to the frame structure of the traction assembly, and wherein the fourth end is being configured for pivotal attachment to the frame of the vehicle.

3. An anti-torque device as claimed in claim 1, wherein the first end is being configured for pivotal attachment to the frame of the vehicle, and wherein the fourth end is being configured for pivotal attachment to the frame structure of the traction assembly.

4. An anti-torque device as claimed in claim 1, wherein the first resilient element is a spring.

5. An anti-torque device as claimed in claim 1, wherein the second resilient element is an elastomeric bushing.

6. An anti-torque device as claimed in claim 1, wherein the first abutment structure is located substantially at the second end of the first elongated member.

7. An anti-torque device as claimed in claim 1, wherein the second abutment structure is located substantially at the third end of the second elongated member.

8. An anti-torque device as claimed in claim 1, wherein a length of the first elongated member is adjustable.

9. An anti-torque device as claimed in claim 1, wherein a length of the second elongated member is adjustable.

10. An anti-torque device for use in cooperation with a tracked assembly for use on a vehicle, the vehicle comprising a frame, the tracked assembly comprising a support structure, the anti-torque device comprising:
   a) a first elongated member comprising a first end and a second end, the first end being configured for pivotal attachment, the first elongated member comprising a first transverse abutment structure substantially located at the second end;
   b) a second elongated member comprising a third end and a fourth end, the second member being slidingly coupled to the first member such that the third end is substantially located between the first end and the second end of the first elongated member, the fourth end being configured for pivotal attachment, the second member comprising a second transverse abutment structure substantially located at the third end, and a third transverse abutment structure located between the fourth end and the second end;
   c) a first resilient element located between the first transverse abutment structure and the second transverse abutment structure for substantially resiliently countering extension of the anti-torque device; and
   d) a second resilient element located between the first transverse abutment structure and the third transverse abutment structure for substantially resiliently countering compression of the anti-torque device.

11. An anti-torque device as claimed in claim 10, wherein the first end is being configured for pivotal attachment to the support structure of the tracked assembly, and wherein the fourth end is being configured for pivotal attachment to the frame of the vehicle.

12. An anti-torque device as claimed in claim 10, wherein the first end is being configured for pivotal attachment to the frame of the vehicle, and wherein the fourth end is being configured for pivotal attachment to the support structure of the tracked assembly.

13. An anti-torque device as claimed in claim 10, wherein the first resilient element is a spring.

14. An anti-torque device as claimed in claim 13, wherein the second resilient element is an elastomeric bushing.

15. An anti-torque device as claimed in claim 10, wherein a length of the first elongated member is adjustable.

16. An anti-torque device as claimed in claim 10, wherein a length of the second elongated member is adjustable.

* * * * *